(12) United States Patent
Cao

(10) Patent No.: US 10,382,810 B2
(45) Date of Patent: Aug. 13, 2019

(54) METHOD AND DEVICE FOR IMPLEMENTING SYNCHRONOUS PLAYING

(71) Applicant: ZTE CORPORATION, Shenzhen, Guangdong Province (CN)

(72) Inventor: Heng Cao, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 15/744,848

(22) PCT Filed: May 6, 2016

(86) PCT No.: PCT/CN2016/081328
§ 371 (c)(1),
(2) Date: Jan. 15, 2018

(87) PCT Pub. No.: WO2017/016266
PCT Pub. Date: Feb. 2, 2017

(65) Prior Publication Data
US 2018/0205986 A1 Jul. 19, 2018

(30) Foreign Application Priority Data
Jul. 27, 2015 (CN) .......................... 2015 1 0446537

(51) Int. Cl.
*H04N 21/8547* (2011.01)
*H04N 21/43* (2011.01)
(Continued)

(52) U.S. Cl.
CPC ... *H04N 21/4307* (2013.01); *H04N 21/23611* (2013.01); *H04N 21/242* (2013.01);
(Continued)

(58) Field of Classification Search
CPC . H04N 21/43; H04N 21/23611; H04N 21/242
(Continued)

(56) References Cited

U.S. PATENT DOCUMENTS

| 2012/0042047 A1 | 2/2012 | Chen et al. |
| 2014/0226553 A1* | 8/2014 | Ko .......................... H04J 3/0635 370/312 |

(Continued)

FOREIGN PATENT DOCUMENTS

| CN | 103198848 A | 7/2013 |
| CN | 103561356 A | 2/2014 |

(Continued)

*Primary Examiner* — Mulugeta Mengesha
*Assistant Examiner* — Franklin S Andramuno
(74) *Attorney, Agent, or Firm* — McDonald Hopkins LLC

(57) ABSTRACT

Provided is a method for implementing synchronous playing. The method is applied to a terminal, and includes: determining a first difference value between system time of each mobile terminal and system time of the present terminal respectively; determining the complexity and playing delay of a playing file which can be processed by each mobile terminal respectively; determining, according to the complexity of the playing file which can be processed by each mobile terminal, the complexity of a file to be played; and sending, according to the first difference value and playing delay corresponding to each mobile terminal which can process the determined complexity, the file to be played to the mobile terminal which can process the complexity of the file to be played.

15 Claims, 2 Drawing Sheets

(51) Int. Cl.
  *H04N 21/236*   (2011.01)
  *H04N 21/242*   (2011.01)
  *H04N 21/41*    (2011.01)
  *H04N 21/436*   (2011.01)

(52) U.S. Cl.
  CPC ..... *H04N 21/4122* (2013.01); *H04N 21/4126* (2013.01); *H04N 21/43* (2013.01); *H04N 21/43615* (2013.01); *H04N 21/8547* (2013.01)

(58) Field of Classification Search
  USPC .................................................. 725/93, 116
  See application file for complete search history.

(56)        References Cited

U.S. PATENT DOCUMENTS

2015/0067016 A1    3/2015  Park et al.
  2015/0120953 A1*   4/2015  Crowe .................... H04L 65/60
                                                      709/231

FOREIGN PATENT DOCUMENTS

CN     104243133 A    12/2014
  CN     104243850 A    12/2014
  CN     104244027 A    12/2014
  EP       2747441 A1    6/2014
  EP       2843663 A1    3/2015

* cited by examiner

METHOD AND DEVICE FOR IMPLEMENTING SYNCHRONOUS PLAYING

TECHNICAL FIELD

The present document relates to, but not limited to, a terminal technology, and particularly to a method and device for implementing synchronous playing.

BACKGROUND

Multi-screen linked scenarios are increasing. For example, a television box supporting a Miracast function is installed at home, that is, the television box is connected with a television set via a High Definition Multimedia Interface (HDMI) cable. When a mobile terminal succeeds in direct connection with the television box via Miracast, the mobile terminal and the television set can display a picture or play an audio/video at the same time. For another example, in a department store, interactive contents such as Grabbing Red Packets are present on a large screen, and after a server of the department store is connected with mobile terminals via Miracast, activity contents can be displayed on the large screen and the mobile terminals at the same time.

Synchronous playing is implemented in the related art via Miracast, including: after setting up a Wi-Fi Peer to Peer (P2P) connection between a device A and a device B, some pieces of Miracast parameter information are exchanged between the device A and the device B before audio/video data are transmitted, a Miracast session is established between the device A and the device B, and when the device A plays an audio/video, the device A sends audio/video data coded by a Moving Picture Experts Group 2-Transport Stream (MPEG2-TS) based on the established session. Herein, the coded audio/video data contain a timestamp for synchronization, and the device B decodes the received audio/video data, and performs synchronous display according to a difference value between a timestamp in the audio/video data and a timestamp at which the audio/video data are received actually.

In the related method for implementing synchronous playing, due to no consideration of influence on an audio/video data transmission process caused by factors such as transmission network bandwidth and hardware performance of a device, the playing delay of the device is longer.

SUMMARY

The following is a brief introduction for a subject described herein in detail. The brief introduction is not intended to restrict the scope of protection of claims.

Embodiments of the present disclosure provide a method and device for implementing synchronous playing, capable of reducing the playing delay of a mobile terminal.

An embodiment of the present disclosure provides a method for implementing synchronous playing, applied to a terminal, and including the steps as follows.

A first difference value between system time of each mobile terminal and system time of the present terminal is determined respectively.

The complexity and playing delay of a playing file which can be processed by each mobile terminal are determined respectively.

The complexity of a file to be played is determined according to the complexity of the playing file which can be processed by each mobile terminal.

The file to be played is sent to the mobile terminal which can process the determined complexity according to the first difference value and the playing delay corresponding to each mobile terminal which can process the determined complexity.

In an exemplary embodiment, the step that a first difference value between system time of each mobile terminal and system time of the present terminal is determined respectively includes that:

a request for feeding back the system time is sent to each mobile terminal; and

For each mobile terminal, after the system time of each mobile terminal is received, the first difference value between the system time of the mobile terminal and the system time of the present terminal is calculated.

In an exemplary embodiment, the step that complexity and playing delay of a playing file which can be processed by each mobile terminal are determined respectively includes the steps as follows.

For each mobile terminal, test file data with different complexities is sent to the mobile terminal respectively, such that the mobile terminal synchronously play test files.

For a test file with each complexity, after playing start time for the test file and playing end time for the test file are received from any mobile terminal, a second difference value between the playing start time corresponding to the mobile terminal for the test file and playing start time of the present terminal for the test file is calculated, and a third difference value between the playing end time corresponding to the mobile terminal for the test file and the playing end time of the present terminal for the test file is calculated; and when it is judged that the second difference value and the third difference value are identical, it is determined that the mobile terminal can process the complexity of the test file, and it is determined that the playing delay is the second difference value or the third difference value.

In an exemplary embodiment, the step that complexity of a file to be played is determined according to the complexity of the playing file which can be processed by each mobile terminal includes that:

the lowest complexity in the complexities of playing files which can be processed by all the mobile terminals is determined as the complexity of the file to be played, or the complexity of a playing file which can be processed by mobile terminals exceeding a pre-set threshold is determined as the complexity of the file to be played.

In an exemplary embodiment, the step that the file to be played is sent, according to the first difference value and playing delay corresponding to each mobile terminal which can process the determined complexity, to the mobile terminal which can process the determined complexity includes that:

the time for sending the file to be played in advance is calculated according to the first difference value and the playing delay corresponding to the mobile terminal which can process the determined complexity; and before playing the file to be played, the present terminal sends the file to be played, of which the length is the time for sending the file to be played in advance, to the mobile terminal which can process the determined complexity; and when playing the file to be played, the present terminal sends a message indicating starting to play the file to be played to the mobile terminal which can process the determined complexity, and continues to send remaining data of the file to be played to the mobile terminal which can process the complexity of the file to be played.

In an exemplary embodiment, the step that the file to be played is sent, according to the first difference value and the playing delay corresponding to each mobile terminal which can process the determined complexity, to the mobile terminal which can process the complexity of the file to be played includes that:

the time for sending the file to be played in advance is calculated according to the first difference value and the playing delay corresponding to the mobile terminal which can process the complexity of the file to be played; and the file to be played is sent to the mobile terminal which can process the complexity of the file to be played at the time for sending the file to be played in advance before the present terminal plays the file to be played.

In an exemplary embodiment, the step that the time for sending the file to be played in advance is calculated according to the first difference value and playing delay corresponding to the mobile terminal which can process the determined complexity includes that:

a sum value of the first difference value corresponding to the mobile terminal which can process the determined complexity and the playing delay corresponding to the determined complexity is calculated; and the time for sending the file to be played in advance is determined as the calculated sum value.

An embodiment of the present disclosure also provides a device for implementing synchronous playing, applied to a terminal, and including a first determination module, a second determination module, a third determination module and a playing module.

The first determination module is configured to determine a first difference value between system time of each mobile terminal and system time of the present terminal respectively.

The second determination module is configured to determine complexity and playing delay of a playing file which can be processed by each mobile terminal respectively.

The third determination module is configured to determine the complexity of a file to be played according to the complexity of the playing file which can be processed by each mobile terminal.

The playing module is configured to send, according to the first difference value and the playing delay corresponding to each mobile terminal which can process the determined complexity, the file to be played to the mobile terminal which can process the complexity of the file to be played.

In an exemplary embodiment, the first determination module is configured to:

send a request for feeding back the system time to each mobile terminal; and for each mobile terminal, after receiving the system time of each mobile terminal, calculate the first difference value between the system time of the mobile terminal and the system time of the present terminal.

In an exemplary embodiment, the second determination module is configured to:

for each mobile terminal, send test file data with different complexities to the mobile terminal respectively, such that the mobile terminal synchronously play test files; for a test file with each complexity, after receiving playing start time for the test file and the playing end time for the test file from any mobile terminal, calculate a second difference value between the playing start time corresponding to the mobile terminal for the test file and the playing start time of the present terminal for the test file, and calculate a third difference value between the playing end time corresponding to the mobile terminal for the test file and the playing end time of the present terminal for the test file; and determine, when judging that the second difference value and the third difference value are identical, that the mobile terminal can process the complexity of the test file, and determine that the playing delay is the second difference value or the third difference value.

In an exemplary embodiment, the third determination module is configured to:

determine the lowest complexity in complexities of playing files which can be processed by all the mobile terminals as the complexity of the file to be played, or determine a complexity of a playing file which can be processed by mobile terminals exceeding a pre-set threshold as the complexity of the file to be played.

In an exemplary embodiment, the playing module is configured to:

calculate the time for sending the file to be played in advance according to the first difference value and playing delay corresponding to the mobile terminal which can process the determined complexity; before the present terminal plays the file to be played, send the file to be played, of which the length is the time for sending the file to be played in advance, to the mobile terminal which can process the determined complexity; and when the present terminal plays the file to be played, send a message indicating starting to play the file to be played to the mobile terminal which can process the determined complexity, and continue to send remaining data of the file to be played to the mobile terminal which can process the complexity of the file to be played.

In an exemplary embodiment, the playing module is configured to:

calculate the time for sending the file to be played in advance according to the first difference value and playing delay corresponding to the mobile terminal which can process the determined complexity and send the file to be played to the mobile terminal which can process the determined complexity at the time for sending the file to be played in advance before the present terminal plays the file to be played.

In an exemplary embodiment, the playing module implements calculation of the time for sending the file to be played in advance according to the first difference value and playing delay corresponding to the mobile terminal which can process the determined complexity in the following manners:

calculating a sum value of the first difference value corresponding to the mobile terminal which can process the determined complexity and the playing delay corresponding to the determined complexity; and determining the time for sending the file to be played in advance as the calculated sum value.

An embodiment of the present disclosure also provides a computer-readable storage medium. The computer-readable storage medium stores a computer-executable instruction. When the computer-executable instruction is executed, the foregoing method for implementing synchronous playing is implemented.

Compared with the related art, the embodiment of the present disclosure includes: determining a first difference value between system time of each mobile terminal and system time of the present terminal respectively; determining the complexity and the playing delay of a playing file which can be processed by each mobile terminal respectively; determining the complexity of a file to be played according to the complexity of the playing file which can be processed by each mobile terminal; and sending, according to the first difference value and the playing delay corresponding to each mobile terminal which can process the determined complexity, the file to be played to the mobile terminal which can process the determined complexity to implement synchronous playing. By comparing a first difference value between the system time of the present terminal and the system time of a mobile terminal and the playing delay of the mobile terminal, the technical solution in the embodiment of the present disclosure implements synchronous playing, thereby reducing the playing delay of the mobile terminal.

After the drawings and the detailed descriptions are read and understood, other aspects can be understood.

BRIEF DESCRIPTION OF DRAWINGS

The drawings in embodiments of the present disclosure are described below. The drawings in the embodiments are used for further understanding of the present application, used to explain the present application together with the description, and do not form limitation to the scope of protection of the present application.

DETAILED DESCRIPTION

The embodiments of the present disclosure will be further described with the drawings, and cannot be used to limit the scope of protection of the present application. It is important to note that the embodiments in the present application and various modes in the embodiments may be mutually combined under the condition of no conflicts.

Figure 1:
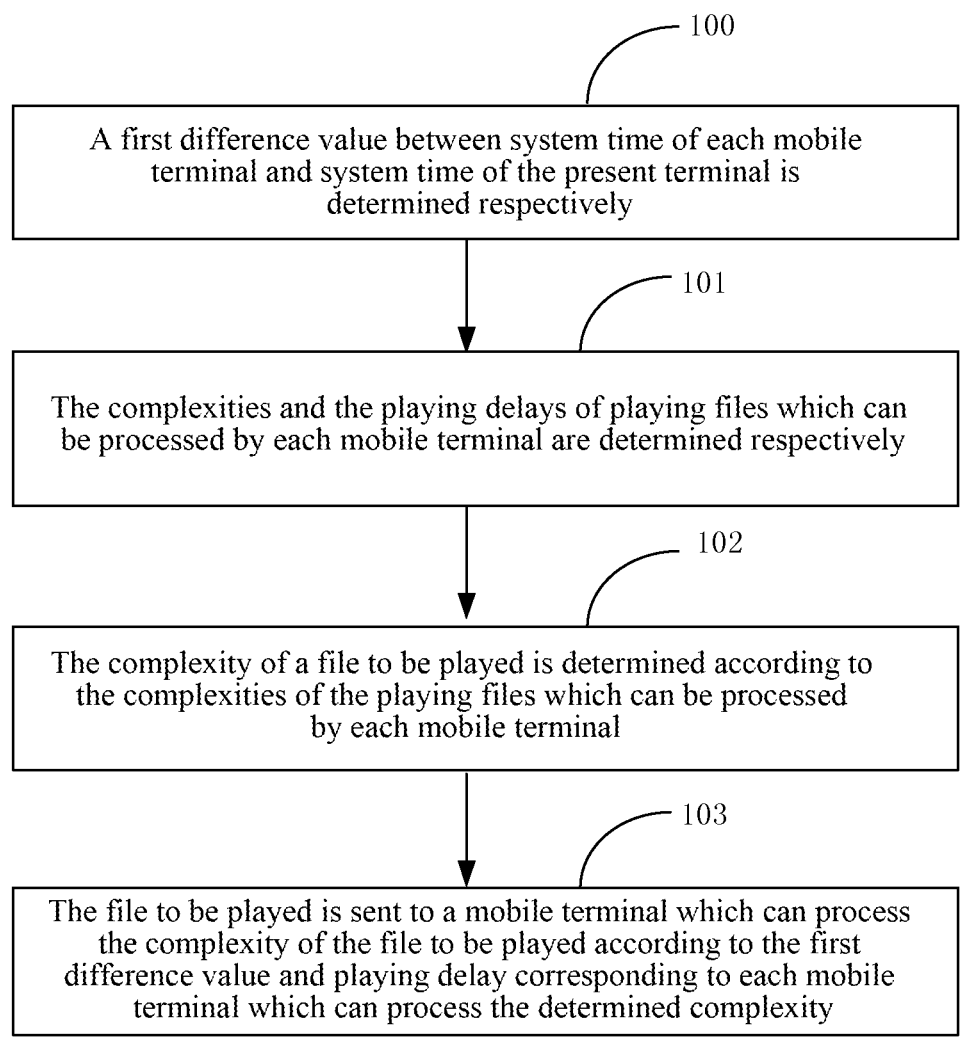
FIG. 1 is a flowchart of a method for implementing synchronous playing according to an embodiment of the present disclosure.

Referring to FIG. 1, an embodiment of the present disclosure provides a method for implementing synchronous playing, which is applied to a terminal and includes the steps 100-103 as follows.

In step 100, a first difference value between system time of each mobile terminal and system time of the present terminal is determined respectively.

In an exemplary embodiment, this step includes that:

a request for feeding back the system time is sent to each mobile terminal; and after the system time of each mobile terminal is received, a first difference value between the system time of each mobile terminal and the system time of the present terminal is calculated.

In step 101, the complexities and the playing delays of playing files which can be processed by each mobile terminal are determined respectively.

In an exemplary embodiment, this step includes the sub-steps as follows.

For each mobile terminal, test file data with different complexities are sent to the mobile terminals respectively, such that the mobile terminals synchronously play test files.

For a test file with each complexity, after the playing start time o for the test file and the playing end time for the test file are received from any mobile terminal, a second difference value between the playing start time corresponding to the mobile terminal for the test file and the playing start time of the present terminal for the test file is calculated, and a third difference value between the playing end time corresponding to the mobile terminal for the test file and the playing end time of the present terminal for the test file is calculated; and when it is judged that the second difference value and the third difference value are identical, it is determined that the mobile terminal can process the complexity of the test file, and it is determined that the playing delay is the second difference value or the third difference value.

Herein, when it is judged that the third difference value is greater than the second difference value, it is determined that the mobile terminal cannot process the complexity of the test file.

In the present embodiment, the playing file may be an audio, a video, a picture or the like.

Herein, the complexity of the video may be a display format of the video or the like.

In an embodiment, the display format may be 360p, 720p, 1080p or the like. Herein, the letter p is representative of line-by-line scanning, and the numbers 360, 720, 1080 and the like are representative of a vertical resolution, namely the quantity of horizontal scanning lines in a vertical direction.

Herein, during multi-screen playing simultaneously, there are different complexities, different processing speeds of the mobile terminals and different transmission rates, which leads to different playing delays of the mobile terminals.

Herein, the terminal and the mobile terminal may synchronously play a test file by using Miracast. Specific implementation pertains to the known art of those skilled in the art, is not used to limit the scope of protection of the embodiments of the present disclosure, and will not be elaborated herein.

In an embodiment, the terminal and the mobile terminal may record the playing start time of the test file and the playing end time of the test file according to a playing start identifier and a playing end identifier in the test file. For example, pure-color pictures may be displayed in the beginning and end of a test video, and may indicate the start and end for playing video. Thus, the terminal and the mobile terminal may record the playing start time of the test video and the playing end time of the test video according to the pure-color pictures.

In step 102, the complexity of a file to be played is determined according to the complexities of the playing files which can be processed by each mobile terminal.

In an exemplary embodiment, this step includes that:

the lowest complexity in the complexities of the playing files which can be processed by all the mobile terminals is determined as the complexity of the file to be played, or the complexity of a playing file which can be processed by mobile terminals exceeding a pre-set threshold is determined as the complexity of the file to be played.

Herein, the pre-set threshold may be a product between the total quantity of mobile terminals and a pre-set proportion, herein the pre-set proportion may be 95% or the like.

In step 103, the file to be played is sent to the mobile terminal which can process the determined complexity according to the first difference value and playing delay corresponding to each mobile terminal which can process the determined complexity.

In an exemplary embodiment, this step includes that:

the time for sending the file to be played in advance is calculated according to the first difference value and playing delay corresponding to the mobile terminal which can process the determined complexity; before playing the file to be played, the present terminal sends the file to be played, of which the length is the time for sending the file to be played in advance, to the mobile terminal which can process the determined complexity; and when playing the file to be played, the present terminal sends a message indicating starting to play the file to be played to the mobile terminal which can process the determined complexity, and continues to send remaining data of the file to be played to the mobile terminal which can process the determined complexity.

Herein, when the mobile terminal which can process the determined complexity receives the file to be played, of which the length is the time for sending the file to be played in advance, the received file to be played, of which the length is the time for sending the file to be played in advance, is cached.

Herein, when receiving the message indicating starting to play the file to be played, the mobile terminal which can process the determined complexity starts to play the file to be played.

Herein, the present terminal may play the file to be played according to the determined complexity; or, the time for sending the file to be played in advance is calculated according to the first difference value and playing delay of the mobile terminal which can process the determined complexity; and the file to be played is sent to the mobile terminal which can process the determined complexity at the time for sending the file to be played in advance before the present terminal plays the file to be played.

In an embodiment, the step that the time for sending the file to be played in advance is calculated according to the first difference value and playing delay corresponding to the mobile terminal which can process the determined complexity includes that:

a sum value of the first difference value corresponding to the mobile terminal which can process the determined complexity and the playing delay corresponding to the determined complexity is calculated; and the time for sending the file to be played in advance is determined as the calculated sum value.

In the present step, the terminal may also send a prompt message to a mobile terminal which cannot process the determined complexity, and is disconnected from the mobile terminal which cannot process the determined complexity.

In an embodiment of the present disclosure, the terminal may include a server or other terminal devices.

By comparing a first difference value with the system time of a mobile terminal and the playing delay of the mobile terminal, the method for implementing synchronous playing in embodiments of the present disclosure implements synchronous playing, thereby reducing the playing delay of the mobile terminal.

The method for implementing synchronous playing in embodiments of the present disclosure is described below with specific examples.

In a shopping mall, a huge display screen in the center of a hall displays the following information: welcome to an activity of grabbing red packets today. The displayed information shows that mobile phones of consumers will be connected within a period of 16:00:00 to 16:19:50 (activity preparation period) for this activity and grabbing red packets will be performed within a period of 16:20:00 (start time point of activity) to 16:21:00 (end time point of activity). The displayed information prompts the name of a shopping mall server for connecting mobile phones of the consumers to facilitate identification of the consumers, and finally reminds the consumers to open the Wi-Fi Display function of the mobile phones such as Miracast or the like.

The shopping mall server or a mobile terminal firstly searches for a mobile phone opening a Wi-Fi P2P function in the background via a Wi-Fi Display related protocol and mechanism, and after searching out a mobile phone, the shopping mall server or the mobile terminal will be actively paired with the mobile phone. When the consumer receives a pairing request and agrees to the pairing request, the shopping mall server or the mobile terminal establishes a Wi-Fi P2P connection with the mobile phone of the consumer.

After the shopping mall server or the mobile terminal establishes a connection with the mobile phone of the consumer, the system time of the mobile phone of the consumer is S0=16:01:02, and is fed back immediately to the shopping mall server or the mobile terminal (feedback process time is regarded as zero due to P2P transfer with highest priority). At this time, the time of the shopping mall server or the mobile terminal is M0=16:01:00, T0=S0−M0=2 s, which means that the system clock of the mobile phone of the consumer is slower than that of the shopping mall server or the mobile terminal by 2 s. Thus, comparison and alignment between the system clock of the shopping mall server or the mobile terminal and the system clock of the mobile phone of the consumer are completed.

The shopping mall server or the mobile terminal distributes an advertisement video to the mobile phone of the consumer, and the playing time of an advertisement is 1 m. The start and end pictures of the advertisement are pure white and pure blue pictures. The playing start time of the shopping mall server or the mobile terminal for a first segment of advertisement video (display format is 360p) is M10=16:01:03, and the playing end time for the first segment of advertisement video is M11=16:02:03. Due to the influence of factors such as video processing of the mobile phone of the consumer, a playing response and video transmission time, the playing start time of the mobile phone of the consumer for the first segment of advertisement video is S10=16:01:07, the playing end time for the first segment of advertisement video is S11=16:02:07. By calculating T10=S10−M10 and T11=S11−M11, the shopping mall server or the mobile terminal obtains a second difference value T10=4 s between the playing start time of the shopping mall server or the mobile terminal for the first segment of advertisement video and the playing start time of the mobile phone of the consumer for the first segment of advertisement video, and obtains a third difference value T11=4 s between the playing end time of the shopping mall server or the mobile terminal for the first segment of advertisement video and the playing end time of the mobile phone of the consumer for the first segment of advertisement video.

The shopping mall server or the mobile terminal distributes a second segment of advertisement video (display format is 720p) to the mobile phone of the consumer. The playing start time of the shopping mall server or the mobile terminal for the second segment of advertisement video is M20=16:02:05, and the playing end time for the second segment of advertisement video is M11=16:03:05. Due to the influence of factors such as video processing of the mobile phone of the consumer, a playing response and video transmission time, the playing start time of the mobile phone of the consumer for the second segment of advertisement video is S10=16:02:10, and the playing end time for the second segment of advertisement video is S11=16:03:10. By calculating T20=S20−M20 and T21=S21−M21, the shopping mall server or the mobile terminal obtains a second difference value T20=5 s between the playing start time of the shopping mall server or the mobile terminal for the second segment of advertisement video and the playing start time of the mobile phone of the consumer for the second segment of advertisement video, and obtains a third difference value T21=5 s between the playing end time of the shopping mall server or the mobile terminal for the second segment of advertisement video and the playing end time of the mobile phone of the consumer for the second segment of advertisement video.

The shopping mall server or the mobile terminal distributes a third segment of advertisement video (display format is 1080p) to the mobile phone of the consumer. The playing start time of the shopping mall server or the mobile terminal for the third segment of advertisement video is M30=16:03:07, and the playing end time for the third segment of advertisement video is M31=16:04:07. Due to the influence of factors such as video processing of the mobile phone of the consumer, a playing response and video transmission time, the playing start time of the mobile phone of the consumer for the third segment of advertisement video is S30=16:03:13, and the playing end time for the third segment of advertisement video is S31=16:04:14. By calculating T30=S30−M30 and T31=S31−M31, the shopping mall server or the mobile terminal obtains a second difference value T30=6 s between the playing start time of the shopping mall server or the mobile terminal for the third segment of advertisement video and the playing start time of the mobile phone of the consumer for the third segment of advertisement video, and obtains a third difference value T31=7 s between the playing end time of the shopping mall server or the mobile terminal for the third segment of advertisement video and the playing end time of the mobile phone of the consumer for the third segment of advertisement video. The shopping mall server or the mobile terminal judges that T31>T30 and T31=T30+1 s, so that display formats of a video which can be processed by the mobile phone of the consumer are 360p and 720p.

After the shopping mall server or the mobile terminal plays three segments of videos and detects the corresponding playing start and end time, the shopping mall server or the mobile terminal kicks off terminals which cannot process 720p from the activity, gives terminal display prompts to the consumers, and cancels connections.

The shopping mall server or the mobile terminal continues to distribute and play 720p videos, and after the system time of two parties is aligned according to T0, the shopping mall server or the mobile terminal sends to the mobile phone of the consumer video data to be played at T0+T20 before the shopping mall server or the mobile terminal plays the video, to achieve synchronous initiation of video playing.

The shopping mall server or the mobile terminal has established Wi-Fi P2P connections with 100 mobile phones of consumers between 16:00:00 and 16:19:50 (activity preparation period), and utilizes the above mechanism to synchronously play videos. The shopping mall server or the mobile terminal may internally file and calculate the situations of the 100 connected mobile phones of the consumers, such as, record information such as a corresponding system time difference, cache time and a hardware processing ability and the like.

The shopping mall server or the mobile terminal will perform playing in advance according to time differences between the 100 mobile phones and the shopping mall server or the mobile terminal. Finally, a red packet page will be issued on time at 16:20:00 of the shopping mall server or the mobile terminal, and the consumers click the page by utilizing the mobile phones thereof, and clicking time points will be recorded and fed back to the shopping mall server or the mobile terminal.

The above-mentioned scenario is representative of a typical application of the present application, which is not limited thereto. Engineering technicians may easily expand it to other similar application scenarios. It will be not elaborated herein.

Figure 2:
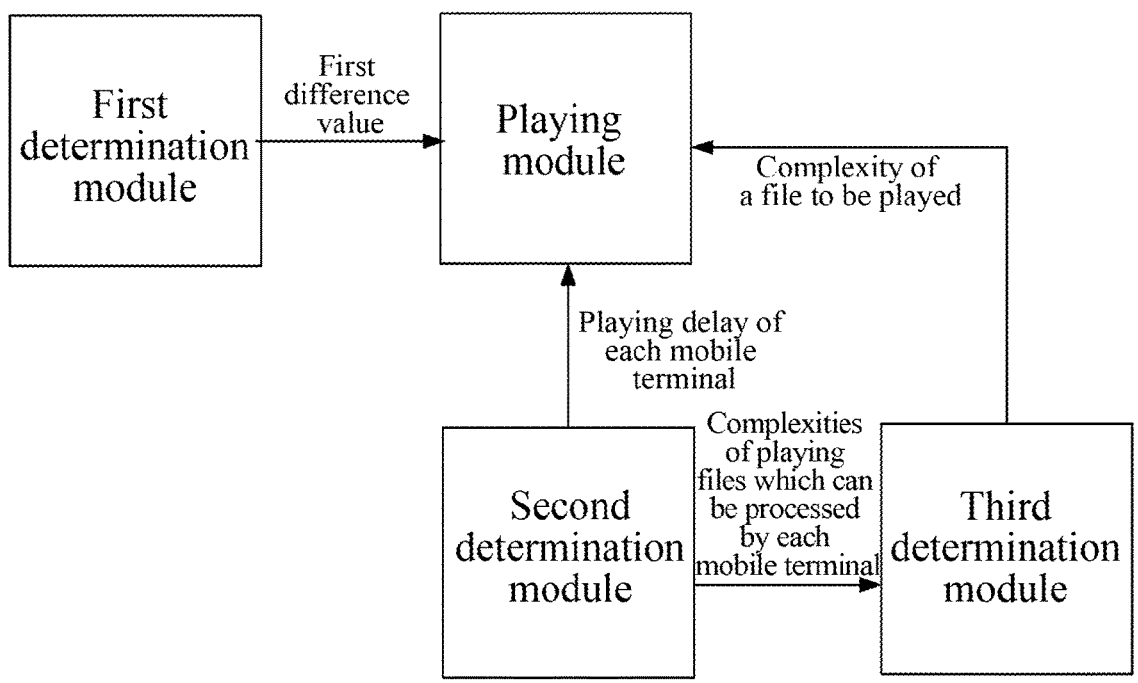
FIG. 2 is a structure composition diagram of a device for implementing synchronous playing according to an embodiment of the present disclosure.

Referring to FIG. 2, an embodiment of the present disclosure also provides a device for implementing synchronous playing, applied to a terminal. The terminal may be a server or other terminal devices. The device at least includes a first determination module, a second determination module, a third determination module and a playing module.

The first determination module is configured to determine a first difference value between system time of each mobile terminal and system time of the present terminal respectively.

The second determination module is configured to determine complexities and playing delays of playing files which can be processed by each mobile terminal respectively.

The third determination module is configured to determine a complexity of a file to be played according to the complexities of the playing files which can be processed by each mobile terminal, herein the each mobile terminal can process the determined complexity.

The playing module is configured to send the file to be played to the mobile terminal which can process the determined complexity according to the first difference value and playing delay corresponding to each mobile terminal, to implement synchronous playing.

In the device of the present embodiment, the first determination module is configured to:

send a request for feeding back the system time to each mobile terminal; and after receiving the system time of each mobile terminal, for each mobile terminal, calculate a first difference value between the system time of the mobile terminal and the system time of the present terminal.

In the device of the present embodiment, the second determination module is configured to:

for each mobile terminal, send test file data with different complexities to each mobile terminal respectively, such that the mobile terminal synchronously play the test files; and for a test file with each complexity, calculate a second difference value between the playing start time corresponding to the mobile terminal for the test file and the playing start time of the present terminal for the test file, and calculate a third difference value between the playing end time corresponding to the mobile terminal for the test file and the playing end time of the present terminal for the test file after receiving the playing start time for the test file and the playing end time for the test file from any mobile terminal; and determine that the mobile terminal can process the complexity of the test file, and determine that the playing delay is the second difference value or the third difference value when judging that the second difference value and the third difference value are identical.

In the device of the present embodiment, the third determination module is configured to:

determine the lowest complexity in the complexities of the playing files which can be processed by all the mobile terminals as the complexity of the file to be played, or determine the complexity of a playing file which can be processed by mobile terminals exceeding a pre-set threshold as the complexity of the file to be played.

In the device of the present embodiment, the playing module is configured to:

calculate the time for sending the file to be played in advance according to the first difference value and playing delay corresponding to the mobile terminal which can process the determined complexity; before the present terminal plays the file to be played, send the file to be played, of which the length is the time for sending the file to be played in advance, to the mobile terminal which can process the determined complexity; and when the present terminal plays the file to be played, send a message indicating starting to play the file to be played to the mobile terminal which can process the determined complexity, and continue to send remaining data of the file to be played to the mobile terminal which can process the determined complexity.

In the device of the present embodiment, the playing module is configured to:

calculate the time for sending the file to be played in advance according to the first difference value and playing delay corresponding to the mobile terminal which can process the determined complexity, and send the file to be played to the mobile terminal which can process the determined complexity at the time for sending the file to be played in advance before the present terminal plays the file to be played.

In the device of the present embodiment, the playing module implements calculation of the time for sending the file to be played in advance according to the first difference value and playing delay corresponding to the mobile terminal which can process the determined complexity in the following manners:

calculating a sum value of the first difference value corresponding to the mobile terminal which can process the determined complexity and the playing delay corresponding to the determined complexity; and determining the time for sending the file to be played in advance as the calculated sum value.

It is important to note that the above-mentioned embodiments are only intended to be easily understood by a person skilled in the art, and not used to limit the scope of protection of the present application. Any obvious replacements, improvements and the like made on the present application by a person skilled in the art without departing from the inventive concept of the present application fall within the scope of protection of the present application.

An embodiment of the present disclosure also provides a non-transitory computer-readable storage medium. The computer-readable storage medium stores a computer-executable instruction. When the computer-executable instruction is executed, the foregoing method for implementing synchronous playing is implemented.

Those of ordinary skill in the art may understand that all or some of the steps in the above-mentioned method may be completed by instructing relevant hardware (such as processor) through a program. The program may be stored in a computer-readable storage medium such as a read-only memory, a magnetic disk or an optical disk or the like. In an exemplary embodiment, all or some of the steps in the above-mentioned embodiments may be implemented by using one or more integrated circuits. Accordingly, each module/unit in the above-mentioned embodiments may be implemented in a form of hardware. For example, corresponding functions thereof are implemented by means of an integrated circuit, and each module/unit may also be implemented in a form of software function module. For example, corresponding functions thereof are implemented by executing programs/instructions stored in a memory by the processor. The present disclosure is not limited to the combination of hardware and software in any specific form. Those of ordinary skill in the art should understand that the technical solution of the present application can be modified or equivalently replaced without departing from the essence and scope of the technical solution of the present application. The modifications or equivalent replacements should fall within the scope of claims of the present application.

INDUSTRIAL APPLICABILITY

The above-mentioned technical solution reduces the playing delay of a mobile terminal.

What is claimed is:

1. A method for implementing synchronous playing, applied to a present terminal, comprising:
   determining a first difference value between system time of each mobile terminal and system time of the present terminal respectively;
   determining complexity and playing delay of a playing file which can be processed by each mobile terminal respectively;
   determining complexity of a file to be played according to the complexity of the playing file which can be processed by each mobile terminal; and
   sending, according to the first difference value and the playing delay corresponding to each mobile terminal which can process the determined complexity, the file to be played to the mobile terminal which can process the determined complexity,
   wherein the sending, according to the first difference value and the playing delay corresponding to each mobile terminal which can process the determined complexity, the file to be played to the mobile terminal which can process the determined complexity comprises:
   calculating time for sending the file to be played in advance according to the first difference value and the playing delay corresponding to the mobile terminal which can process the determined complexity;
   before the present terminal plays the file to be played, sending the file to be played, of which a length is the time for sending the file to be played in advance, to the mobile terminal which can process the determined complexity; and
   when the present terminal plays the file to be played, sending a message indicating starting to play the file to be played to the mobile terminal which can process the determined complexity, and continuing to send remaining data of the file to be played to the mobile terminal which can process the complexity of the file to be played.

2. The method according to claim 1, wherein the determining a first difference value between system time of each mobile terminal and system time of the present terminal respectively comprises:
   sending a request for feeding back the system time to each mobile terminal; and
   for each mobile terminal, calculating the first difference value between the system time of the mobile terminal and the system time of the present terminal after receiving the system time of each mobile terminal.

3. The method according to claim 1, wherein the determining complexity and playing delay of a playing file which can be processed by each mobile terminal respectively comprises:
   for each mobile terminal, sending test file data with different complexities to the mobile terminal respectively, such that the mobile terminal synchronously play test files;
   for a test file with each complexity, after receiving playing start time for the test file and playing end time for the test file from any mobile terminal, calculating a second difference value between the playing start time corresponding to the mobile terminal for the test file and playing start time of the present terminal for the test file, and calculating a third difference value between the playing end time corresponding to the mobile terminal for the test file and playing end time of the present terminal for the test file; and when judging that the second difference value and the third difference value are identical, determining that the mobile terminal can process the complexity of the test file, and determining that the playing delay is the second difference value or the third difference value.

4. The method according to claim 1, wherein the determining complexity of a file to be played according to the complexity of the playing file which can be processed by each mobile terminal comprises:
determining a lowest complexity in complexities of playing files which can be processed by all the mobile terminals as the complexity of the file to be played, or determining a complexity of a playing file which can be processed by mobile terminals exceeding a pre-set threshold as the complexity of the file to be played.

5. The method according to claim 1, wherein the sending, according to the first difference value and the playing delay corresponding to each mobile terminal which can process the determined complexity, the file to be played to the mobile terminal which can process the determined complexity comprises:
calculating time for sending the file to be played in advance according to the first difference value and the playing delay corresponding to the mobile terminal which can process the complexity of the file to be played; and
sending the file to be played to the mobile terminal which can process the complexity of the file to be played at the time for sending the file to be played in advance before the present terminal plays the file to be played.

6. The method according to claim 5, wherein the calculating time for sending the file to be played in advance according to the first difference value and the playing delay corresponding to the mobile terminal which can process the determined complexity comprises:
calculating a sum value of the first difference value corresponding to the mobile terminal which can process the determined complexity and playing delay corresponding to the determined complexity; and
determining the time for sending the file to be played in advance as the calculated sum value.

7. A device for implementing synchronous playing, applied to a present terminal, comprising:
a first determination module, configured to determine a first difference value between system time of each mobile terminal and system time of the present terminal respectively;
a second determination module, configured to determine complexity and playing delay of a playing file which can be processed by each mobile terminal respectively;
a third determination module, configured to determine complexity of a file to be played according to the complexity of the playing file which can be processed by each mobile terminal; and
a playing module, configured to send, according to the first difference value and the playing delay corresponding to each mobile terminal which can process the determined complexity, the file to be played to the mobile terminal which can process the determined complexity, wherein the playing module is configured to:
calculate time for sending the file to be played in advance according to the first difference value and the playing delay corresponding to the mobile terminal which can process the determined complexity;
before the present terminal plays the file to be played, send the file to be played, of which a length is the time for sending the file to be played in advance, to the mobile terminal which can process the determined complexity; and
when the present terminal plays the file to be played, send a message indicating starting to play the file to be played to the mobile terminal which can process the determined complexity, and continuing to send remaining data of the file to be played to the mobile terminal which can process the determined complexity.

8. The device according to claim 7, wherein the first determination module is configured to:
send a request for feeding back the system time to each mobile terminal; and for each mobile terminal, after receiving the system time of each mobile terminal, calculate the first difference value between the system time of the mobile terminal and the system time of the present terminal.

9. The device according to claim 7, wherein the second determination module is configured to:
for each mobile terminal, send test file data with different complexities to the mobile terminal respectively, such that the mobile terminal synchronously play test files;
for a test file with each complexity, after receiving playing start time for the test file and the playing end time for the test file from any mobile terminal, calculate a second difference value between the playing start time corresponding to the mobile terminal for the test file and playing start time of the present terminal for the test file, and calculate a third difference value between the playing end time corresponding to the mobile terminal for the test file and playing end time of the present terminal for the test file; and
determine, when judging that the second difference value and the third difference value are identical, that the mobile terminal can process the complexity of the test file, and determine that the playing delay is the second difference value or the third difference value.

10. The device according to claim 7, wherein the third determination module is configured to:
determine a lowest complexity in complexities of playing files which can be processed by all the mobile terminals as the complexity of the file to be played, or determine a complexity of a playing file which can be processed by mobile terminals exceeding a pre-set threshold as the complexity of the file to be played.

11. The device according to claim 7, wherein the playing module is configured to:
calculate time for sending the file to be played in advance according to the first difference value and the playing delay corresponding to the mobile terminal which can process the determined complexity; and
send the file to be played to the mobile terminal which can process the determined complexity at the time for sending the file to be played in advance before the present terminal plays the file to be played.

12. The device according to claim 7, wherein the playing module implements calculation of the time for sending the file to be played in advance according to the first difference value and the playing delay corresponding to the mobile terminal which can process the determined complexity in the following manners:

calculating a sum value of the first difference value corresponding to the mobile terminal which can process the determined complexity and playing delay corresponding to the determined complexity; and determining the time for sending the file to be played in advance as the calculated sum value.

13. A non-transitory computer-readable storage medium storing a computer-executable instruction, and when the computer-executable instruction is executed, the method for implementing synchronous playing according to claim 1 is implemented.

14. The method according to claim 5, wherein the calculating time for sending the file to be played in advance according to the first difference value and the playing delay corresponding to the mobile terminal which can process the determined complexity comprises:

calculating a sum value of the first difference value corresponding to the mobile terminal which can process the determined complexity and playing delay corresponding to the determined complexity; and
  determining the time for sending the file to be played in advance as the calculated sum value.

15. The device according to claim 11, wherein the playing module implements calculation of the time for sending the file to be played in advance according to the first difference value and the playing delay corresponding to the mobile terminal which can process the determined complexity in the following manners:

calculating a sum value of the first difference value corresponding to the mobile terminal which can process the determined complexity and playing delay corresponding to the determined complexity; and
  determining the time for sending the file to be played in advance as the calculated sum value.

* * * * *